US012727065B2

(12) United States Patent
Wang et al.

(10) Patent No.: US 12,727,065 B2
(45) Date of Patent: Sep. 1, 2026

(54) SPECTRUM-BASED LIGHT-EMITTING FIXTURE AND SPECTRUM-BASED LIGHT EMISSION METHOD

(71) Applicant: SHENZHEN LIGHTSPOT TECHNOLOGY LIMITED, Shenzhen (CN)

(72) Inventors: Ruixun Wang, Shenzhen (CN); Jixiang Wang, Shenzhen (CN); Chengzhang Tan, Shenzhen (CN); Xiangde Kong, Shenzhen (CN)

(73) Assignee: SHENZHEN LIGHTSPOT TECHNOLOGY LIMITED, Shenzhen (CN)

( * ) Notice: Subject to any disclaimer, the term of this patent is extended or adjusted under 35 U.S.C. 154(b) by 11 days.

(21) Appl. No.: 18/981,625

(22) Filed: Dec. 15, 2024

(65) Prior Publication Data

US 2025/0220788 A1 Jul. 3, 2025

(30) Foreign Application Priority Data

Dec. 29, 2023 (CN) ......................... 202311861762.6

(51) Int. Cl.
*H05B 45/20* (2020.01)

(52) U.S. Cl.
CPC .................................... *H05B 45/20* (2020.01)

(58) Field of Classification Search
None
See application file for complete search history.

(56) References Cited

U.S. PATENT DOCUMENTS 12,556,276 B2 * 2/2026 Lin ...................... H04B 10/116

* cited by examiner

*Primary Examiner* — Kenneth B Wells
(74) *Attorney, Agent, or Firm* — Che-Yang Chen

(57) ABSTRACT

The present invention provides a spectrum-based light-emitting fixture and a spectrum-based light emission method. The spectrum-based light-emitting fixture has light sources with multiple emission peak wavelengths, the spectrum-based light emission method is based on waveband integral calculus, where absorption peaks in a given spectrum that meet energy variation requirements are identified, and their wavelengths are used to divide primary wavebands. Each primary waveband is further subdivided into multiple secondary wavebands, and the spectral energy of each secondary waveband is calculated through integration. The selected light sources have emission peak wavelengths that are close to and match the mid-wavelengths of the secondary wavebands. By matching the light sources with the spectral energy of the corresponding secondary wavebands, the adjustment of spectrum-based light emission is achieved, thus, the emission spectrum of the spectrum-based light-emitting fixture can highly restore the given spectrum with high accuracy.

22 Claims, 10 Drawing Sheets

SPECTRUM-BASED LIGHT-EMITTING FIXTURE AND SPECTRUM-BASED LIGHT EMISSION METHOD

CROSS REFERENCE OF RELATED APPLICATION

This application is a non-provisional application that claims the benefit of priority under 35 U.S.C. § 119 to a Chinese application, application number 202311861762.6, filed Dec. 29, 2023, which is incorporated herewith by reference in its entirety.

BACKGROUND OF THE PRESENT INVENTION

Field of Invention

The present invention relates to the field of lighting, and particularly relates to a spectrum-based light-emitting fixture and a spectrum-based light emission method.

Description of Related Arts

With the continuous development of LED lighting technology, lighting is not only required to be efficient and energy-saving but also to provide healthy and comfortable light color quality, which has increasingly attracted attention. As new technologies emerge, higher standards are being set for light quality and comfort, especially regarding requirements for healthy lighting.

Full-spectrum lighting has become a key goal in LED lighting based on the demand for healthy lighting. Full-spectrum lighting, as the name suggests, is a lighting method that includes all visible light, ultraviolet light, and infrared light in the spectrum. Its primary characteristic is a close resemblance to the natural light spectrum. Compared with traditional LED lighting, full-spectrum lighting is closer to the color balance of sunlight, and can provide a more realistic and natural lighting effect. This lighting method has a positive impact on people's visual health and comfort, and helps to improve work efficiency and reduce fatigue. The application range of full-spectrum lighting is wide, including but not limited to medical, education, entertainment, and construction fields. At the same time, as technology progresses and awareness of health and environmental protection grows, the application scope of full-spectrum lighting is expected to expand further. For instance, the integration of intelligent control through advancements in artificial intelligence is anticipated to become a key development trend in full-spectrum lighting.

In summary, full-spectrum lighting is currently a development direction for LED lighting, with broad application prospects and important social significance. However, in terms of the current development of full-spectrum lighting, on the one hand, the emission spectrum of current full-spectrum lighting fixtures is single, unable to simulate the natural changes of sunlight based on factors like time, geographical coordinates, weather, environment, etc., which may cause physiological disorders of the human body due to long-term use; on the other hand, the current full-spectrum lighting fixtures have low restoration degree of the solar spectrum, which is specifically demonstrated in the defects of the color rendering index (CRI) of the current full-spectrum lighting fixtures. In such full-spectrum lighting fixtures, the color rendering index (CRI) is measured by 15 fixed colors R1-R15 to measure the lighting's ability to restore these 15 colors. The stronger the restoration ability, the closer the value is to 100. Theoretically, the color rendering index (CRI) of sunlight is 100. The color rendering index (CRI) of LED lights depends on the similarity of their spectrum to the spectrum of a standard light source of the same color temperature (5000K and above for theoretical sunlight, 5000K and below for black body light). If they are completely similar, the color rendering index (CRI) is 100; the lower the similarity, the lower the color rendering index (CRI). Currently, many artificial lights on the market claim a color rendering index (CRI)≥90. In the field of professional film and television lighting, which has extremely high requirements for color rendering index (CRI), most brands can achieve a color rendering index (CRI)≥90, and some high-quality lights can achieve a color rendering index (CRI)≥95. However, the color rendering index (CRI) claimed on the lights on the market is mostly a general color rendering index (CRI), which only takes the average value of the R1-R8 color rendering index (CRI). The high restoration ability of these 8 colors can indeed meet the needs of ordinary color restoration, but in the case of bright colors and high requirements for accurate color restoration, such as filming movies, TV commercials, broadcasting studios, photography, and some special lighting scenarios such as museums, galleries, luxury goods, mahogany furniture, printing and dyeing factories, hair dyeing salons, etc., there are also higher requirements for the restoration of colors R9-R15 in saturated colors and skin tone, which all need to exceed 90, so as to ensure that the light source has a high degree of restoration of human skin color and object original color, and does not deviate from the color. In other words, only when the general color rendering index (CRI) of R1-R8 exceeds 95 and the color rendering index (CRI) of R9-R15 (especially R9 saturated red and R12 saturated blue) exceeds 90, can the color restoration ability comparable to sunlight be truly achieved, and there are very few lighting brands on the market that can improve the special color rendering index (CRI) of R9-R15 to above 90.

SUMMARY OF THE PRESENT INVENTION

The objective of the present invention is to provide a spectrum-based light-emitting fixture and a spectrum-based light emission method, wherein the spectrum-based light-emitting fixture, based on the spectrum-based light emission method, can emit light with high spectral restoration accuracy according to a given spectrum. Depending on different given spectra or the dynamic changes of a given spectrum, the spectrum-based light-emitting fixture has a corresponding emission spectrum. In other words, the emission spectrum of the spectrum-based light-emitting fixture can accurately restore the given spectrum, specifically when the given spectrum is in the state of solar spectrum, the spectrum-based light-emitting fixture exhibits full-spectrum lighting characteristics with a high color rendering index (CRI), where the color rendering indices (CRI) of R1-R15 are all greater than 90.

Another objective of the present invention is to provide a spectrum-based light-emitting fixture and a spectrum-based light emission method, wherein the emission spectrum of the spectrum-based light-emitting fixture can accurately restore the given spectrum and adjust according to the given spectrum, in which the present invention proposes a concept of spectrum-based lighting adjustment, which is different from the traditional lighting adjustment of brightness adjustment and color temperature adjustment. The spectrum-based lighting adjustment method is more suitable for adapting to and matching the user's expression of the needs for natural light conditions by selecting the given spectrum.

Another objective of the present invention is to provide a spectrum-based light-emitting fixture and a spectrum-based light emission method, wherein the spectrum-based light-emitting fixture, based on the spectrum-based light emission method, can emit light with high spectral restoration accuracy according to a given spectrum. In the state where the given spectrum is replaced or exhibits dynamic changes, the emission spectrum of the spectrum-based light-emitting fixture also changes correspondingly. Thus, the spectrum-based light-emitting fixture can meet different lighting needs according to different given spectra or the dynamic changes of the given spectrum, such as meeting the lighting needs of sunlight at different times of day or in different geographical conditions.

Another objective of the present invention is to provide a spectrum-based light-emitting fixture and a spectrum-based light emission method, wherein the given spectrum in the spectrum-based light-emitting fixture can be either spectrum information pre-stored in the spectrum-based light-emitting fixture or spectrum information externally loaded from a network or a mobile storage medium. For the spectrum-based light-emitting fixture, the setting method of the given spectrum is flexible and diverse, which facilitates the setting of the given spectrum in different installation environments, thus having better applicability.

Another objective of the present invention is to provide a spectrum-based light-emitting fixture and a spectrum-based light emission method, wherein the spectrum-based light-emitting fixture has multiple light sources, in the state where each light source has at least one corresponding emission peak wavelength, the light sources of the spectrum-based light-emitting fixture exhibit multiple emission peak wavelengths, wherein the spectrum-based light emission method is based on the idea of waveband integral calculus, by identifying absorption peaks in a given spectrum that meet certain energy variation requirements, the absorption peak wavelengths are used as boundaries to divide the primary wavebands $B_m$. Then, each primary waveband $B_m$ is subdivided into multiple secondary wavebands $B_{mn}$, and the spectral energy $E_{mn}$ of each secondary waveband $B_{mn}$ is calculated through integration. When selecting the light sources of the spectrum-based light-emitting fixture or subdividing the secondary wavebands $B_{mn}$, the light sources have emission peak wavelengths are close to and match the mid-wavelengths of the corresponding secondary wavebands $B_{mn}$. Therefore, by matching the radiant flux of the corresponding light sources with the spectral energy $E_{mn}$ of the corresponding secondary wavebands $B_{mn}$, the adjustment of spectrum-based light emission can be realized. As a result, the emission spectrum of the corresponding spectrum-based light-emitting fixture can accurately restore the given spectrum.

Another objective of the present invention is to provide a spectrum-based light-emitting fixture and a spectrum-based light emission method, wherein when selecting the light sources of the spectrum-based light-emitting fixture or subdividing the secondary wavebands $B_{mn}$ according to the spectrum-based light emission method, the light sources have emission peak wavelengths are close to and match the mid-wavelengths of the corresponding secondary wavebands $B_{mn}$. In other words, in the state where the light sources of the spectrum-based light-emitting fixture in the spectrum-based light emission method have been selected, the secondary waveband $B_{mn}$ is subdivided based on the emission peak wavelength of the corresponding light source as the mid-wavelength, or after subdividing the secondary waveband $B_m$, the light sources with emission peak wavelengths that are close to and match the mid-wavelengths of the corresponding secondary wavebands $B_{mn}$ are selected. Therefore, the spectrum-based light emission method is applicable to both the light emission method of the spectrum-based light-emitting fixture and the manufacturing method of spectrum-based light-emitting fixture.

To achieve at least one of the above objectives, according to one aspect of the present invention, the present invention provides a spectrum-based light emission method, wherein the spectrum-based light emission method comprises the following steps:

(A) Providing a given a spectrum to the spectrum-based light-emitting fixture, wherein the given spectrum has absorption peaks that are presented as peaks and troughs in the variation of radiant energy values along the wavelength;

(B) Dividing the given spectrum into primary wavebands $B_m$ based on the identification of absorption peaks in the given spectrum that meets certain energy variation requirements and use the wavelengths of the absorption peaks as boundaries;

(C) Subdividing each primary waveband $B_m$ into multiple secondary wavebands $B_{mn}$, where the light sources of the spectrum-based light-emitting fixture have emission peak wavelengths that are close to and match the mid-wavelengths of the corresponding secondary wavebands $B_{mn}$, wherein the starting wavelength of each secondary waveband $B_{mn}$ is denoted as $\lambda_{mnS}$, the ending wavelength is denoted as $\lambda_{mnE}$, and the mid-wavelength of each secondary waveband $B_{mn}$ is calculated as $(\lambda_{mnS}+\lambda_{mnE})/2$;

(D) Integrating the spectral energy $E_{mn}$ of each secondary waveband $B_{mn}$; and (E) Matching the radiant flux of the corresponding light source with the spectral energy $E_{mn}$ of the corresponding secondary waveband $B_{mn}$.

In one embodiment, in step (A) further comprises normalizing the given spectrum, and using the normalized relative spectrum as the final given spectrum.

In one embodiment, in step (B), the identified absorption peaks are absorption peaks that appear in the form of troughs.

In one embodiment, in step (C), the bandwidth of each secondary waveband $B_{mn}$ that corresponds to $(\lambda_{mnE}-\lambda_{mnS})$ meets the condition 2 nm$\leq(\lambda_{mnE}-\lambda_{mnS})\leq$50 nm.

In one embodiment, in step (C), the light source of the spectrum-based light-emitting fixture has emission peak wavelength that is close to and matches the mid-wavelength of each secondary waveband $B_{mn}$, within a 10 nm difference.

In one embodiment, in step (D), the spectral energy $E_{mn}$ of each secondary waveband $B_{mn}$ is obtained by a simplified formula $$E_{mn}=\Sigma_{\lambda_{mnS}}^{\lambda_{mnE}-1}\phi\lambda,$$

where Ø is the relative radiant energy value of the given spectrum.

In one embodiment, in step (C), when the spectrum-based light-emitting fixture has already been manufactured, and the light sources corresponding to the spectrum-based light-emitting fixture have been selected with multiple emission peak wavelengths, the secondary waveband $B_{mn}$ is subdivided based on the emission peak wavelength of the corresponding light source as the mid-wavelength, such that the light source of the spectrum-based light-emitting fixture has an emission peak wavelength that is close to and matches the mid-wavelength of each secondary waveband $B_{mn}$.

In one embodiment, in step (C), when the spectrum-based light-emitting fixture has already been manufactured, and the light sources corresponding to the spectrum-based light-emitting fixture have been selected with multiple emission peak wavelengths, after subdividing the secondary waveband $B_{mn}$, light sources with emission peak wavelengths that are close to the mid-wavelengths of the corresponding secondary wavebands $B_{mn}$ are selected as the actual light-emitting light sources of the spectrum-based light-emitting fixture, such that the actual light-emitting light sources of the spectrum-based light-emitting fixture have emission peak wavelengths that are close to and match the mid-wavelengths of the corresponding secondary wavebands $B_{mn}$.

In one embodiment, in step (C), after subdividing each primary waveband $B_m$ into multiple secondary wavebands $B_{mn}$, the following step is further included:

Selecting light sources with emission peak wavelengths that are close to and match the mid-wavelengths of the corresponding secondary wavebands $B_{mn}$ as the light sources of the spectrum-based light-emitting fixture.

In one embodiment, in the state where a single light source has multiple emission peak wavelengths based on a combination of different LED chips, the single light source is equivalently regarded as multiple light sources with different emission peak wavelengths in the spectrum-based light-emitting fixture, wherein the radiant power of each LED chip in the single light source is independently and adjustably set, corresponding to step (E), setting the radiant flux of the light source with each emission peak wavelength is equivalent to setting the radiant power of the LED chip with the same emission peak wavelength in the single light source.

In one embodiment, in the state where a single light source has multiple emission peak wavelengths based on the combination of different wavelength conversion materials in its packaging silicone, the single light source is equivalently regarded as multiple light sources with different emission peak wavelengths in the spectrum-based light-emitting fixture, corresponding to step (E), the radiant flux of each light source with a specific emission peak wavelength is equivalent to the mass ratio of the wavelength conversion material with the same emission peak wavelength to the packaging silicone.

In one embodiment, in step (B), one primary waveband $B_1$ in the primary wavebands $B_m$ is defined using the absorption peaks at wavelengths of 431 nm and 486 nm as boundaries.

In one embodiment, according to step (C), the primary waveband $B_1$ is subdivided into four secondary wavebands $B_{11}$, $B_{12}$, $B_{13}$, and $B_{14}$, wherein the bandwidth of the secondary wavebands $B_{11}$, $B_{12}$ and $B_{13}$ is 10 nm, and the bandwidth of the secondary waveband $B_{14}$ is 25 nm, the corresponding wavelength ranges of the secondary wavebands $B_{11}$, $B_{12}$, $B_{13}$, and $B_{14}$ are 431 nm-441 nm, 441 nm-451 nm, 451 nm-461 nm, and 461 nm-486 nm, respectively. Therefore, the mid-wavelength of the secondary waveband $B_{11}$ is 436 nm, the mid-wavelength of the secondary waveband $B_{12}$ is 446 nm, the mid-wavelength of the secondary waveband $B_{13}$ is 456 nm, and the mid-wavelength of the secondary waveband $B_{14}$ is 473.5 nm.

In one embodiment, LED chips with emission peak wavelengths in the ranges of 436±5 nm, 446±5 nm, 456±5 nm, and 473.5±5 nm are selected as the light sources for the spectrum-based light-emitting fixture to obtain emission peak wavelengths that match the mid-wavelengths of the corresponding secondary wavebands, and wavelength conversion matching for the LED chips is performed simultaneously, using fluorescent powders with emission peak wavelengths in the ranges of 495±5 nm, 535±5 nm, and 655±5 nm, respectively, to obtain emission peak wavelengths that match the wavebands other than the primary waveband $B_1$.

In one embodiment, in step (B), one primary waveband $B_2$ in the primary wavebands $B_m$ is defined using the absorption peaks at wavelengths of 686 nm and 850 nm as boundaries.

In one embodiment, in step (C), the primary waveband $B_2$ is subdivided into eight secondary wavebands $B_{21}$, $B_{22}$, $B_{23}$, $B_{24}$, $B_{25}$, $B_{26}$, $B_{27}$, and $B_{28}$, wherein the bandwidth of the secondary wavebands $B_{21}$, $B_{22}$, $B_{23}$, $B_{24}$, $B_{25}$, $B_{26}$ and $B_{27}$ is 20 nm, and the bandwidth of the secondary waveband $B_{28}$ is 24 nm, the corresponding wavelength ranges of the secondary wavebands $B_{21}$, $B_{22}$, $B_{23}$, $B_{24}$, $B_{25}$, $B_{26}$, $B_{27}$, and $B_{28}$ are 686 nm-706 nm, 706 nm-726 nm, 726 nm-746 nm, 746 nm-766 nm, 766 nm-786 nm, 786 nm-806 nm, 806 nm-826 nm, and 826 nm-850 nm, respectively. Therefore, the mid-wavelengths of the secondary wavebands $B_{21}$, $B_{22}$, $B_{23}$, $B_{24}$, $B_{25}$, $B_{26}$, $B_{27}$, and $B_{28}$ are 696 nm, 716 nm, 736 nm, 756 nm, 776 nm, 796 nm, 816 nm, and 838 nm, respectively.

In one embodiment, LED chips with emission peak wavelengths within the wavelength ranges of the secondary wavebands $B_{11}$, $B_{12}$, $B_{13}$, $B_{14}$, $B_{21}$, $B_{22}$, $B_{23}$, $B_{24}$, $B_{25}$, $B_{26}$, $B_{27}$, and $B_{28}$ are selected as the light sources for the spectrum-based light-emitting fixture, and fluorescent powders with emission peak wavelengths in the ranges of 736±5 nm, 796±5 nm, and 816±5 nm are selected to perform wavelength conversion matching with the LED chips to obtain emission peak wavelengths that match the mid-wavelengths of the corresponding secondary wavebands.

In one embodiment, fluorescent powders with emission peak wavelengths in the ranges of 495±5 nm, 525±5 nm, 535±5 nm, 554±5 nm, 605±5 nm, and 655±5 nm are further selected to perform wavelength conversion matching with the LED chips to obtain emission peak wavelengths that match the wavebands other than the primary waveband $B_1$ and the primary waveband $B_2$.

According to another aspect of the present invention, the present invention also provides a spectrum-based light-emitting fixture, the spectrum-based light-emitting fixture has multiple light sources, in the state where each light source has at least one corresponding emission peak wavelength, the light sources of the spectrum-based light-emitting fixture exhibit multiple emission peak wavelengths, wherein the spectrum-based light-emitting fixture emits light according to the following steps:

(a) Providing a given a spectrum to the spectrum-based light-emitting fixture;

(b) Dividing the given spectrum into primary wavebands $B_m$ based on the identification of absorption peaks in the given spectrum that meet certain energy variation requirements and use the wavelengths of the absorption peaks as boundaries;

(c) Subdividing each primary waveband $B_m$ into multiple secondary wavebands $B_{mn}$, where the light sources of the spectrum-based light-emitting fixture have emission peak wavelengths that are close to and match the mid-wavelengths of the corresponding secondary wavebands $B_{mn}$, wherein the starting wavelength of each secondary waveband $B_{mn}$ is denoted as $\lambda_{mnS}$, the ending wavelength is denoted as $\lambda_{mnE}$, and the mid-wavelength of each secondary waveband $B_{mn}$ is calculated as $(\lambda_{mnS}+\lambda_{mnE})/2$;

(d) Integrating the spectral energy $E_m$ of each secondary waveband $B_{mn}$; and (e) Matching the radiant flux of the corresponding light source with the spectral energy $E_{mn}$ of the corresponding secondary waveband $B_m$.

In one embodiment, in step (a) further comprises normalizing the given spectrum, and using the normalized relative spectrum as the final given spectrum.

In one embodiment, in step (c), the bandwidth of each secondary waveband $B_{mn}$ that corresponds to $(\lambda_{mnE}-\lambda_{mnS})$ meets the condition 10 nm$\leq(\lambda_{mnE}-\lambda_{mnS})\leq$40 nm.

In one embodiment, in step (c), the light source of the spectrum-based light-emitting fixture has an emission peak wavelength that is close to and matches the mid-wavelength of each secondary waveband $B_m$, within a 5 nm difference range.

In one embodiment, in step (d), the spectral energy $E_{mn}$ of each secondary waveband $B_{mn}$ is obtained by a simplified formula $$E_{mn}=\Sigma_{\lambda_{mnS}}^{\lambda_{mnE}-1}\phi\lambda,$$

where Ø is the relative radiant energy value of the given spectrum.

In one embodiment, in step (c), the secondary waveband $B_{mn}$ is subdivided based on the emission peak wavelength of the corresponding light source as the mid-wavelength, such that the light source of the spectrum-based light-emitting fixture has an emission peak wavelength that is close to and matches the mid-wavelength of each secondary waveband $B_{mn}$.

In one embodiment, at least one light source is based on a combination of different wavelength conversion materials in its packaging silicone to have multiple emission peak wavelengths.

In one embodiment, at least one light source is based on a combination of different LED chips to have multiple emission peak wavelengths, wherein the radiant power of each LED chip in the light source is independently and adjustably set, corresponding to step (e), setting the radiant flux of the light source with each emission peak wavelength is equivalent to setting the radiant power of the LED chip with the same emission peak wavelength in the light source.

Through the understanding of the subsequent description and drawings, the further objectives and advantages of the present invention will be fully demonstrated.

DETAILED DESCRIPTION OF THE PREFERRED EMBODIMENT

Figure 1:
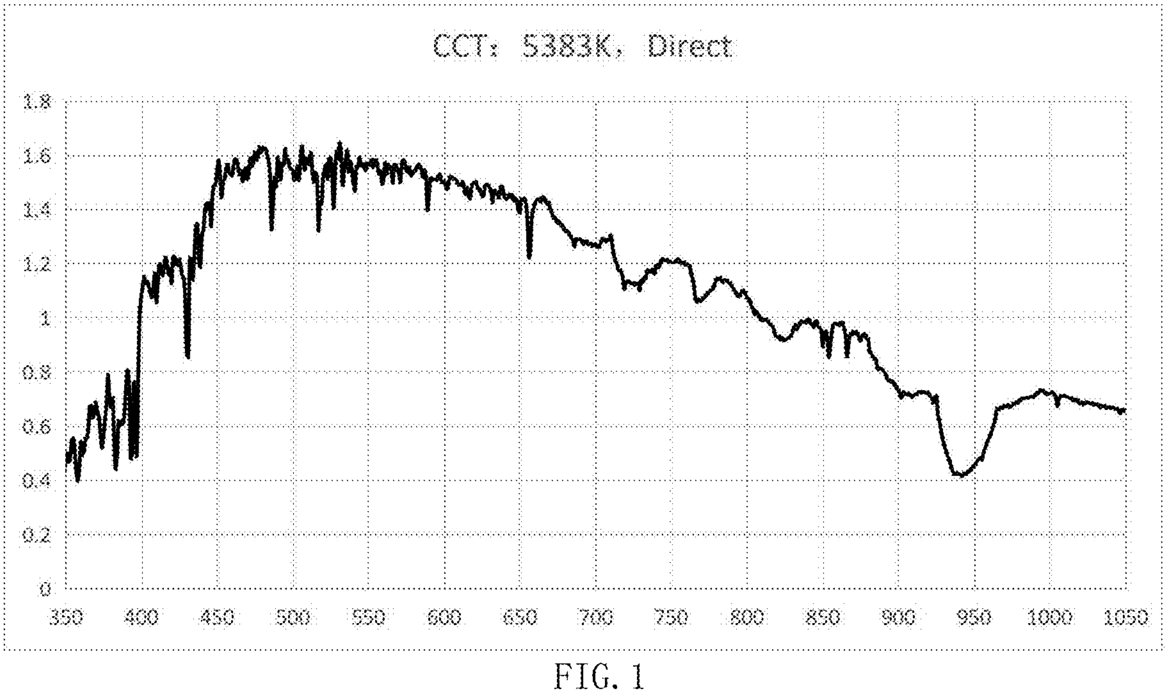
FIG. 1 is a solar spectrum.

The following description is used to explain the present invention so that those skilled in the art can implement the present invention. The preferred embodiments in the following description are only examples, and those skilled in the art can think of other obvious variations. The basic principles of the present invention defined in the following description can be applied to other embodiments, modifications, improvements, equivalents, and other technical solutions without departing from the spirit and scope of the present invention.

It is to be understood that the term "a" should be interpreted to mean "at least one" or "one or more." In one embodiment, the number of an element can be one, while in another embodiment, the number of that element can be multiple. The term "a" should not be interpreted as a limitation on quantity.

The present invention provides a spectrum-based light-emitting fixture and a spectrum-based light emission method, wherein the spectrum-based light-emitting fixture, based on the spectrum-based light emission method, can emit light with high spectral restoration accuracy according to a given spectrum. Depending on different given spectra or the dynamic changes of a given spectrum, the spectrum-based light-emitting fixture has a corresponding emission spectrum. In other words, the emission spectrum of the spectrum-based light-emitting fixture can accurately restore the given spectrum, specifically when the given spectrum is in the state of solar spectrum, the spectrum-based light-emitting fixture exhibits full-spectrum lighting characteristics with a high color rendering index (CRI), where the color rendering indices (CRI) of R1-R15 are all greater than 90.

Specifically, the spectrum-based light-emitting fixture has multiple light sources, in the state where each light source has at least one corresponding emission peak wavelength, the light sources of the spectrum-based light-emitting fixture exhibit multiple emission peak wavelengths, wherein the spectrum-based light emission method is based on the idea of waveband integral calculus, by identifying absorption peaks in a given spectrum that meet certain energy variation requirements, the absorption peak wavelengths are used as boundaries to divide the primary wavebands $B_m$. Then, each primary waveband $B_m$ is subdivided into multiple secondary wavebands $B_{mn}$, and the spectral energy $E_{mn}$ of each secondary waveband $B_{mn}$ is calculated through integration. When selecting the light sources of the spectrum-based light-emitting fixture or subdividing the secondary wavebands $B_{mn}$, the light sources have emission peak wavelengths are close to and match the mid-wavelengths of the corresponding secondary wavebands $B_m$. Therefore, by matching the radiant flux of the corresponding light sources with the spectral energy $E_{mn}$ of the corresponding secondary wavebands $B_{mn}$, the adjustment of spectrum-based light emission can be realized. As a result, the emission spectrum of the corresponding spectrum-based light-emitting fixture can accurately restore the given spectrum.

It is worth noting that the absorption peak of the given spectrum is the peaks and troughs presented by the variations in radiant energy values along the wavelength, wherein the identification of the absorption peak in the given spectrum that meets certain energy variation requirements can be either the identification of the peak and trough that meet certain energy variation requirements, or the independent identification of the peak or trough that meets certain energy variation requirements, and preferably the identification of the trough that meets certain energy variation requirements.

It is also worth noting that when selecting the light sources of the spectrum-based light-emitting fixture or subdividing the secondary wavebands $B_{mn}$ according to the spectrum-based light emission method, the light sources have emission peak wavelengths are close to and match the mid-wavelengths of the corresponding secondary wavebands $B_{mn}$. In other words, in the state where the light sources of the spectrum-based light-emitting fixture in the spectrum-based light emission method have been selected, the secondary waveband $B_{mn}$ is subdivided by the emission peak wavelength of the corresponding light source as the mid-wavelength, or after subdividing the secondary waveband $B_{mn}$, the light sources with emission peak wavelengths that are close to and match the mid-wavelengths of the corresponding secondary wavebands $B_{mn}$ are selected. Therefore, the spectrum-based light emission method is applicable to both the light emission method of the spectrum-based light-emitting fixture and the manufacturing method of spectrum-based light-emitting fixture.

Specifically, the spectrum-based light emission method includes the following steps:

(A) Providing a given a spectrum to the spectrum-based light-emitting fixture, wherein the given spectrum has absorption peaks that are presented as peaks and troughs in the variation of radiant energy values along the wavelength;

(B) Dividing the given spectrum into primary wavebands $B_m$ based on the identification of absorption peaks in the given spectrum that meets certain energy variation requirements and use the wavelengths of the absorption peaks as boundaries;

(C) Subdividing each primary waveband $B_m$ into multiple secondary wavebands $B_{mn}$, where the light sources of the spectrum-based light-emitting fixture have emission peak wavelengths that are close to and match the mid-wavelengths of the corresponding secondary wavebands $B_{mn}$, wherein the starting wavelength of each secondary waveband $B_{mn}$ is denoted as $\lambda_{mnS}$, the ending wavelength is denoted as $\lambda_{mnE}$, and the mid-wavelength of each secondary waveband $B_{mn}$ is calculated as $(\lambda_{mnS}+\lambda_{mnE})/2$;

(D) Integrating the spectral energy $E_{mn}$ of each secondary waveband $B_{mn}$; and (E) Matching the radiant flux of the corresponding light source with the spectral energy $E_{mn}$ of the corresponding secondary waveband $B_m$.

Figure 2:
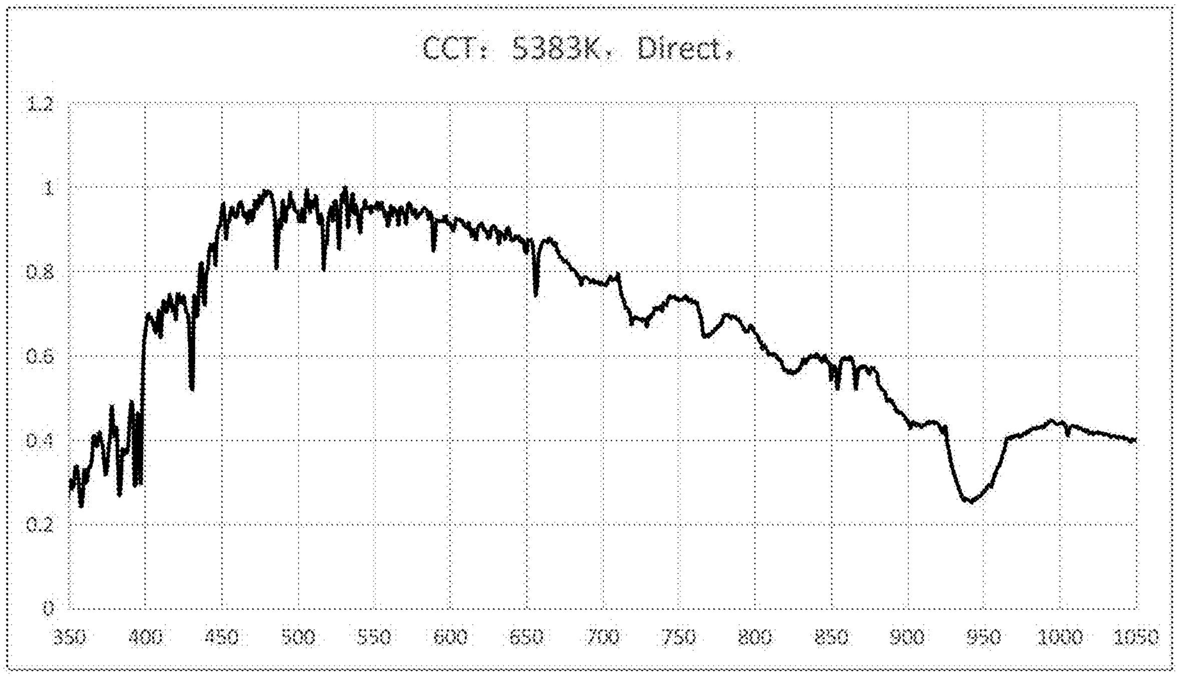
FIG. 2 is the normalized relative spectrum of the above solar spectrum after normalization processing.

Particularly, in step (A) further comprises normalizing the given spectrum, and using the normalized relative spectrum as the final given spectrum. For example, when the initially given spectrum is a solar spectrum corresponding to FIG. 1, normalizing the solar spectrum shown in FIG. 1 can obtain the normalized relative spectrum shown in FIG. 2.

It is worth noting that in step (A), the given spectrum can be either spectrum information pre-stored in the spectrum-based light-emitting fixture or spectrum information externally loaded from a network or a mobile storage medium. For the spectrum-based light-emitting fixture, the setting method of the given spectrum is flexible and diverse. For example, the given spectrum can be configured via remote control, voice control, and an APP on a portable communication device, which facilitates the setting of the given spectrum in different installation environments, thus having better applicability.

Furthermore, in step (C), the bandwidth of each secondary waveband $B_{mn}$ that corresponds to $(\lambda_{mnE}-\lambda_{mnS})$ meets the condition 2 nm$\leq(\lambda_{mnE}-\lambda_{mnS})\leq$50 nm. Preferably, the bandwidth meets the condition 10 nm$\leq(\lambda_{mnE}-\lambda_{mnS})\leq$40 nm, and more preferably, meets the condition 10 nm$\leq(\lambda_{mnE}-\lambda_{mnS})$ $\leq$15 nm, and the bandwidths of each of the secondary wavebands $B_{mn}$ are not limited to being the same.

Additionally, in step (C), the light sources of the spectrum-based light-emitting fixture have emission peak wavelengths that are close to the mid-wavelengths of each secondary waveband $B_{mn}$. It should be understood that the light sources of the spectrum-based light-emitting fixture have emission peak wavelengths that are within a 10 nm difference from the mid-wavelength of each secondary waveband $B_m$, and preferably meet the condition of being close within a 5 nm difference.

Specifically, in step (C), when the spectrum-based light-emitting fixture has already been manufactured, and the corresponding light sources of the spectrum-based light-emitting fixture have been selected with multiple emission peak wavelengths, the secondary waveband $B_{mn}$ is subdivided based on the emission peak wavelength of the corresponding light source as the mid-wavelength, or after subdividing the secondary waveband $B_{mn}$, the light sources with emission peak wavelengths that are close to and match the mid-wavelengths of the corresponding secondary wavebands $B_m$ are selected as the actual light-emitting light sources of the spectrum-based light-emitting fixture, the corresponding spectrum-based light emission method is applicable to the light emission method of the spectrum-based light-emitting fixture.

In other words, the spectrum-based light-emitting fixture has multiple light sources, in the state where each light source has at least one corresponding emission peak wavelength, the light sources of the spectrum-based light-emitting fixture exhibit multiple emission peak wavelengths, wherein the further technical features of the spectrum-based light-emitting fixture can be disclosed based on the spectrum-based light emission method, and the corresponding spectrum-based light-emitting fixture emits light according to the following steps:

(a) Providing a given a spectrum to the spectrum-based light-emitting fixture;

(b) Dividing the given spectrum into primary wavebands $B_m$ based on the identification of absorption peaks in the given spectrum that meet certain energy variation requirements and use the wavelengths of the absorption peaks as boundaries;

(c) Subdividing each primary waveband $B_m$ into multiple secondary wavebands $B_{mn}$), where the light sources of the spectrum-based light-emitting fixture have emission peak wavelengths that are close to and match the mid-wavelengths of the corresponding secondary wavebands $B_{mn}$, wherein the starting wavelength of each secondary waveband $B_{mn}$ is denoted as $\lambda_{mnS}$, the ending wavelength is denoted as $\lambda_{mnE}$, and the mid-wavelength of each secondary waveband $B_{mn}$ is calculated as $(\lambda_{mnS}+\lambda_{mnE})/2$;

(d) Integrating the spectral energy $E_{mn}$ of each secondary waveband $B_{mn}$; and (e) Matching the radiant flux of the corresponding light source with the spectral energy En of the corresponding secondary waveband $B_{mn}$.

It is worth noting that in step (C) of the spectrum-based light emission method, after subdividing each primary waveband $B_m$ into multiple secondary wavebands $B_{mn}$, the following step is further included:

Selecting light sources with emission peak wavelengths that are close to and match the mid-wavelengths of the corresponding secondary wavebands Bmm as the light sources of the spectrum-based light-emitting fixture. The corresponding spectrum-based light emission method is also applicable to the manufacturing method of the spectrum-based light-emitting fixture.

It is to be understood that the light source, based on the corresponding emission peak wavelength requirement, can be implemented as an LED chip with the corresponding emission peak wavelength, or as a wavelength conversion material with the corresponding emission peak wavelength, such as a fluorescent material. To optimize the cost of the light source, a single light source can be designed based on a combination of different wavelength conversion materials, or based on a non-full coverage structure of wavelength conversion materials on an LED chip, or based on a combination of different LED chips, preferably having multiple emission peak wavelengths. In this case, the single light source can be understood as multiple light sources with different emission peak wavelengths in the spectrum-based light emission method of the present invention, and the present invention does not limit this. Correspondingly, the spectrum-based light-emitting fixture of the present invention has multiple light sources, in the state where each light source has at least one corresponding emission peak wavelength, the light sources of the spectrum-based light-emitting fixture exhibit multiple emission peak wavelengths.

Specifically, in the state where a single light source has multiple emission peak wavelengths based on a combination of different LED chips, the single light source is equivalently regarded as multiple light sources with different emission peak wavelengths in the spectrum-based light-emitting fixture, wherein the radiant power of each LED chip in the single light source is preferably to be independently and adjustably set, corresponding to steps (E) and (e), wherein setting the radiant flux of the light source with each emission peak wavelength is equivalent to setting the radiant power of the LED chip with the same emission peak wavelength in the single light source.

It is worth noting that, based on the spectrum-based light emission method of the present invention, the emission spectrum of the spectrum-based light-emitting fixture can accurately restore the given spectrum and adjust according to the given spectrum, in which the present invention proposes a concept of spectrum-based lighting adjustment, which is different from the traditional lighting adjustment of brightness adjustment and color temperature adjustment. The spectrum-based lighting adjustment method is more suitable for adapting to and matching the user's expression of the needs for natural light conditions by selecting the given spectrum.

In addition, the spectrum-based light-emitting fixture, based on the spectrum-based light emission method, can emit light with high spectral restoration accuracy according to a given spectrum. In the state where the given spectrum is replaced or exhibits dynamic changes, the emission spectrum of the spectrum-based light-emitting fixture also changes correspondingly. Thus, the spectrum-based light-emitting fixture can meet different lighting needs according to different given spectra or the dynamic changes of the given spectrum, such as meeting the lighting needs of sunlight at different times of day or in different geographical conditions.

To further understand the present invention, when the given spectrum corresponds to a solar spectrum, the spectrum-based light emission method of one embodiment of the present invention is further disclosed in the following description.

Figure 3:
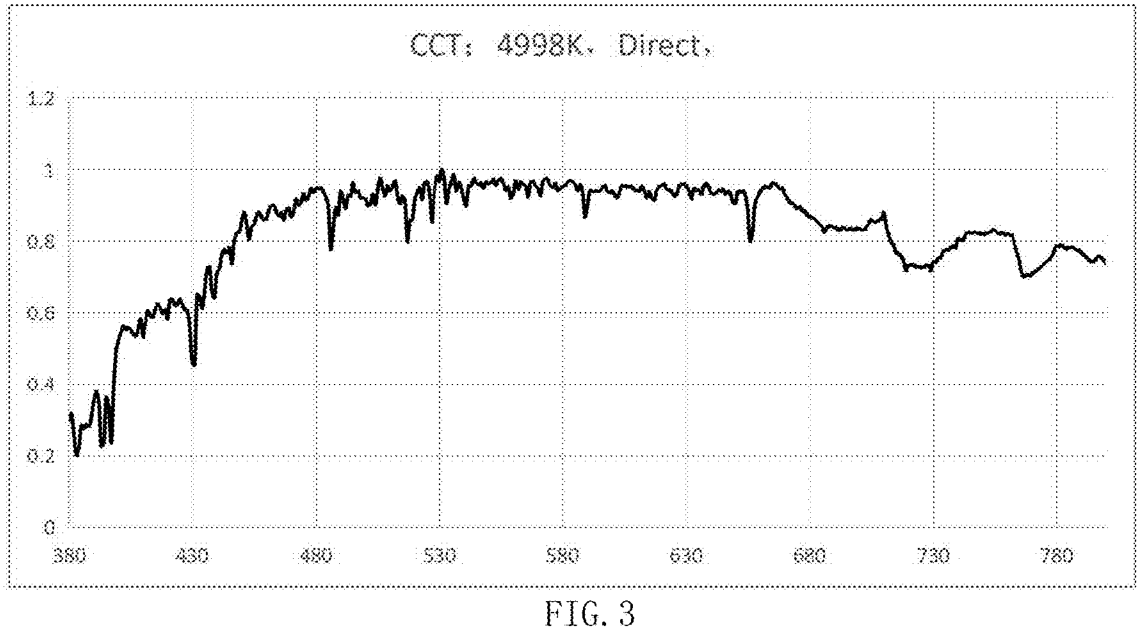
FIG. 3 is the given 4998K color temperature solar relative spectrum in the spectrum-based light emission method of one embodiment of the present invention.

Specifically, in this embodiment of the present invention, the solar relative spectrum shown in FIG. 3 is used as the final given spectrum in step (A), where the solar relative spectrum shown in FIG. 3 is the 380 nm-800 nm wavelength band portion of the 4998K color temperature solar relative spectrum. It can be understood that the 5000K color temperature is equivalent to the sunlight one hour after sunrise or one hour before sunset, and most of the daytime direct sunlight has a color temperature between 5000K to 5600K. Therefore, using the 4998K color temperature solar relative spectrum as the final given spectrum in step (A) is significant for achieving sunlight lighting.

Figure 4:
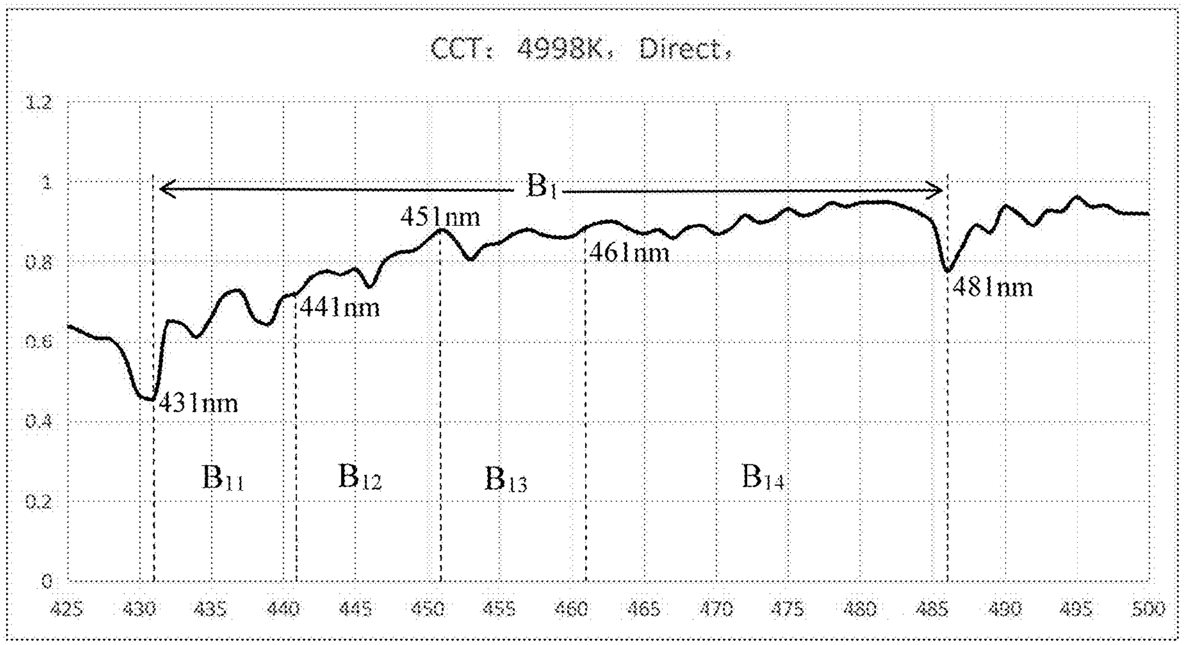
FIG. 4 is the enlarged view of the spectrum of the 4998K color temperature solar relative spectrum in the 425 nm to 500 nm wavelength range.

Furthermore, to simplify the description of the data for better understanding of steps (B) to (D) of the spectrum-based light emission method of the present invention, the 425 nm-500 nm wavelength band portion in the solar relative spectrum shown in FIG. 3 is further enlarged and shown in FIG. 4, wherein according to step (B), in the solar relative spectrum shown in FIG. 4, a primary waveband $B_1$ is divided with the absorption peak wavelengths of 431 nm and 486 nm as boundaries (i.e., the subscript m in $B_m$ is taken as 1); wherein according to step (C), the primary waveband $B_1$ is subdivided into four secondary wavebands $B_{11}$, $B_{12}$, $B_{13}$, and $B_{14}$. Specifically, in this embodiment of the present invention, the bandwidth of the secondary wavebands $B_{11}$, $B_{12}$ and $B_{13}$ is 10 nm, and the bandwidth of the secondary waveband $B_{14}$ is 25 nm. The corresponding wavelength ranges of the secondary wavebands $B_{11}$, $B_{12}$, $B_{13}$, and $B_{14}$ are 431 nm-441 nm, 441 nm-451 nm, 451 nm-461 nm, and 461 nm-486 nm, respectively. Therefore, the mid-wavelength of the secondary waveband $B_{11}$ is 431+10/2=436 nm, the mid-wavelength of the secondary waveband $B_{12}$ is 441+10/2=446 nm, the mid-wavelength of the secondary waveband $B_{13}$ is 451+10/2=456 nm, and the mid-wavelength of the secondary waveband $B_{14}$ is 461+25/2=473.5 nm. A light source with an emission peak wavelength that is close to and matches the mid-wavelength of each of the secondary wavebands $B_{11}$, $B_{12}$, $B_{13}$, and $B_{14}$ is selected as the light source of the spectrum-based light-emitting fixture. Specifically, in this embodiment of the present invention, LED chips with emission peak wavelengths of 437 nm, 446 nm, 459 nm, and 470 nm are selected as the light sources of the spectrum-based light-emitting fixture, so that the light source has an emission peak wavelength that matches the mid-wavelength of each of the secondary wavebands; wherein according to step (D), the spectral energy $E_{11}$, $E_{12}$, $E_{13}$, and $E_{14}$ of the secondary wavebands $B_{11}$, $B_{12}$, $B_{13}$, and $B_{14}$ are integrated. Specifically, in this embodiment of the present invention, according to a simplified formula $$E_{mn} = \Sigma_{\lambda_{mnS}}^{\lambda_{mnE}-1} \emptyset\lambda,$$

where Ø is the relative radiant energy value (i.e., the ordinate value in the solar relative spectrum shown in FIG. 4). Thus, $E_{11}$=6.48, $E_{12}$=7.85, $E_{13}$=8.56, and $E_{14}$=9.19 are obtained correspondingly; wherein according to step (E), the radiant flux of the light source with an emission peak wavelength of 437 nm is matched with the spectral energy En of the secondary waveband $B_{11}$, the radiant flux of the light source is matched with an emission peak wavelength of 446 nm with the spectral energy $E_{12}$ of the secondary waveband $B_{12}$, the radiant flux of the light source is matched with an emission peak wavelength of 459 nm with the spectral energy $E_{13}$ of the secondary waveband $B_{13}$, and the radiant flux of the light source with an emission peak wavelength of 470 nm is matched with the spectral energy $E_{14}$ of the secondary waveband $B_{14}$.

It is worth noting that in this embodiment of the present invention, the specific numerical values of the emission peak wavelengths of the LED chips selected are merely examples. The corresponding light source having an emission peak wavelength that is close to the mid-wavelength of each of the secondary wavebands $B_{mn}$ should be understood as a light source having an emission peak wavelength within the wavelength range of the secondary waveband $B_{mn}$, wherein the emission peak wavelength is preferably within a 5 nm difference from the mid-wavelength of the corresponding secondary waveband $B_{mn}$.

Specifically, in this embodiment of the present invention, to optimize the cost of the light sources for the spectrum-based light-emitting fixture, the light sources are further subjected to wavelength conversion and matching using the packaging silicone and fluorescent powder in the ratios shown in the following table:

| Packaging Silicone | Fluorescent powder 495 nm | Fluorescent powder 535 nm | Fluorescent powder 655 nm |
|---|---|---|---|
| 1 | 0.02569 | 0.34888 | 0.04954 |

The emission peak wavelength of the fluorescent powder in the above table is allowed to have a tolerance range of 5 nm, and the corresponding fluorescent powder ratio is allowed to have a tolerance range of 150% based on the exemplary values shown in the table above. The present invention does not limit this. In other words, in this embodiment of the present invention, wavelength conversion matching for the LED chips is further performed simultaneously using fluorescent powders with emission peak wavelengths in the ranges of 495±5 nm, 535±5 nm, and 655±5 nm, respectively, to obtain emission peak wavelengths that match the wavebands other than the primary waveband $B_1$.

It can be understood that the mass ratio of the fluorescent powder with the corresponding emission peak wavelength to the packaging silicone can be determined according to the matching relationship between the radiant flux of the light source with the same emission peak wavelength and the corresponding spectral energy $E_{mn}$ in step (E). In other words, to optimize the cost of the light source, in the state where a single light source has multiple emission peak wavelengths based on combinations of different wavelength conversion materials, the single light source can be equivalently regarded as multiple light sources with different emission peak wavelengths, where the radiant flux of each light source corresponds to the mass ratio of the wavelength conversion material with the same emission peak wavelength to the packaging silicone. Thus, the mass ratio of the wavelength conversion material with different emission peak wavelengths to the packaging silicone can be determined based on the matching relationship between the radiant flux of the corresponding light source and the spectral energy En of the corresponding secondary waveband $B_{mn}$ in step (E).

Figure 5:
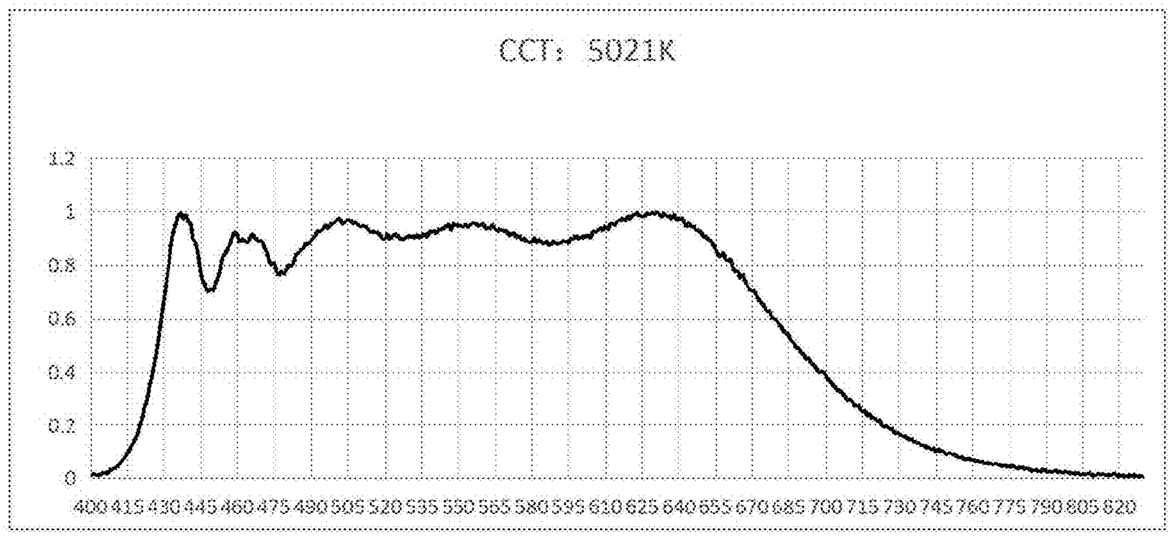
FIG. 5 is the emission spectrum of the spectrum-based light emission method in the above embodiment of the present invention.
Figure 6:
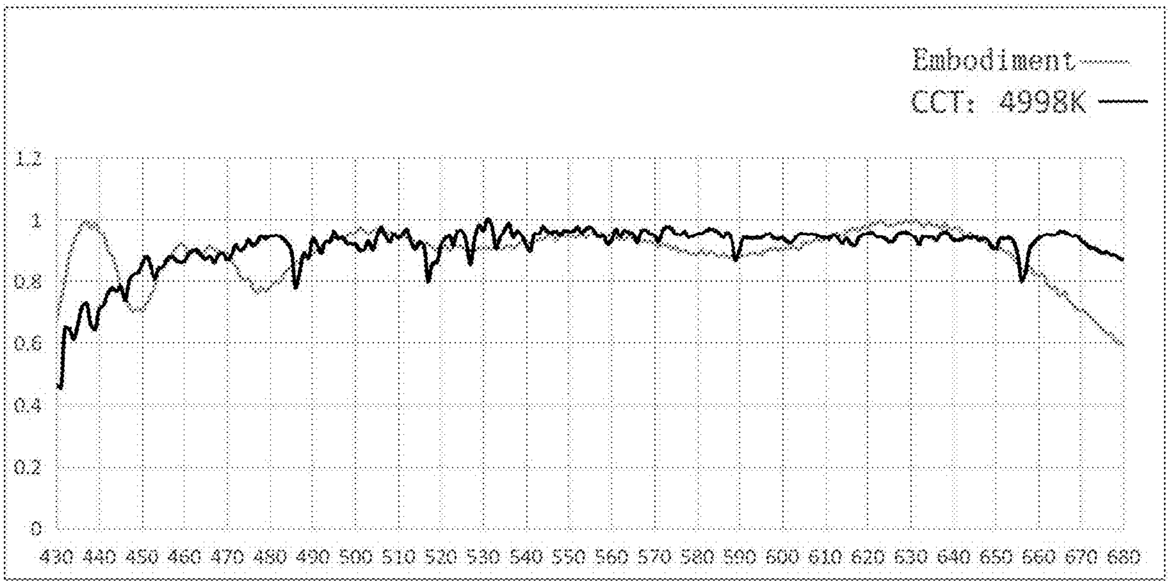
FIG. 6 is a comparative schematic view of the emission spectrum of the spectrum-based light emission method in the above embodiment of the present invention and the 4998K color temperature solar relative spectrum in the 430 nm to 680 nm wavelength range.

The spectrum of the light emitted by the spectrum-based light emission method of this embodiment of the present invention, as shown in FIG. 5, is compared with the 4998K color temperature solar relative spectrum in the 430 nm-680 nm wavelength band portion as shown in FIG. 3, and the comparison is presented in FIG. 6. It can be seen that the spectrum of the light emitted by the spectrum-based light emission method of this embodiment of the present invention exhibits a high degree of restoration to the given spectrum.

Figure 7:
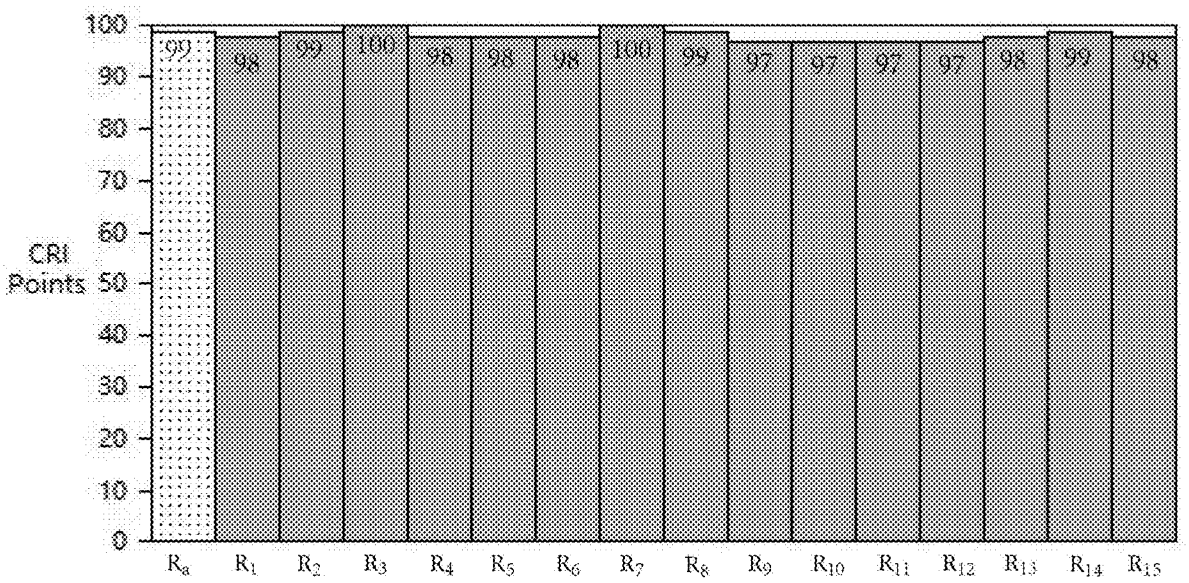
FIG. 7 is a schematic view of the color rendering index (CRI) of the light produced by the spectrum-based light emission method in the above embodiment of the present invention.
Figure 8:
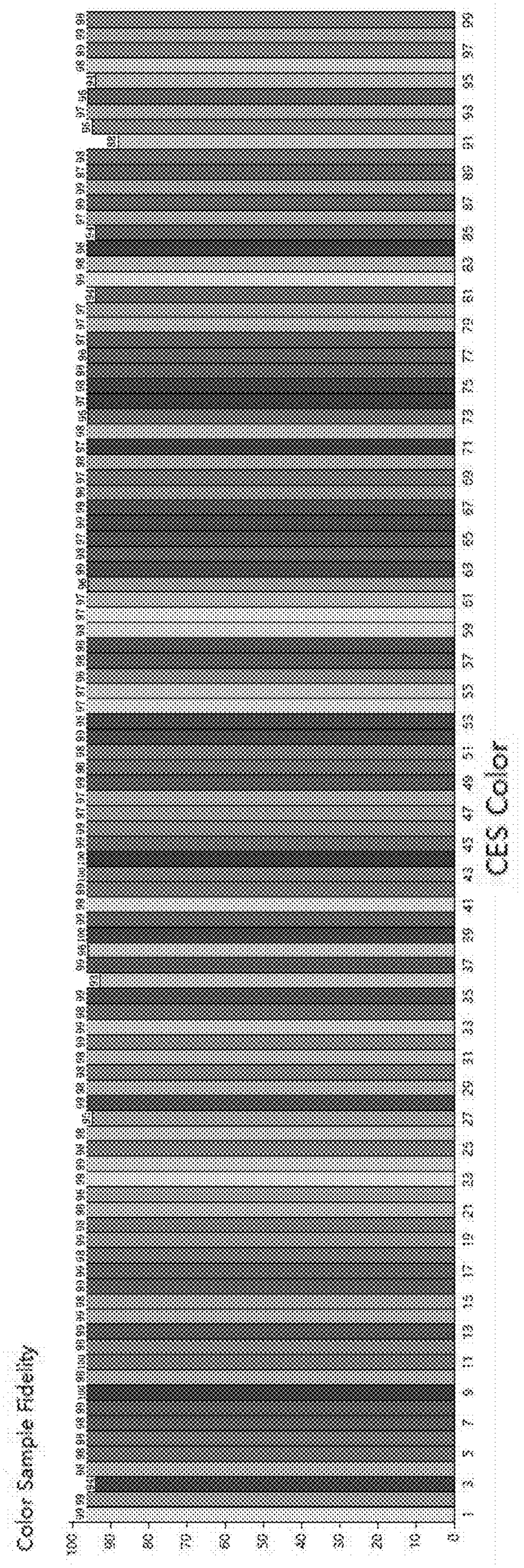
FIG. 8 is a schematic view of the TM-30 fidelity index of the light produced by the spectrum-based light emission method in the above embodiment of the present invention.
Figure 9:
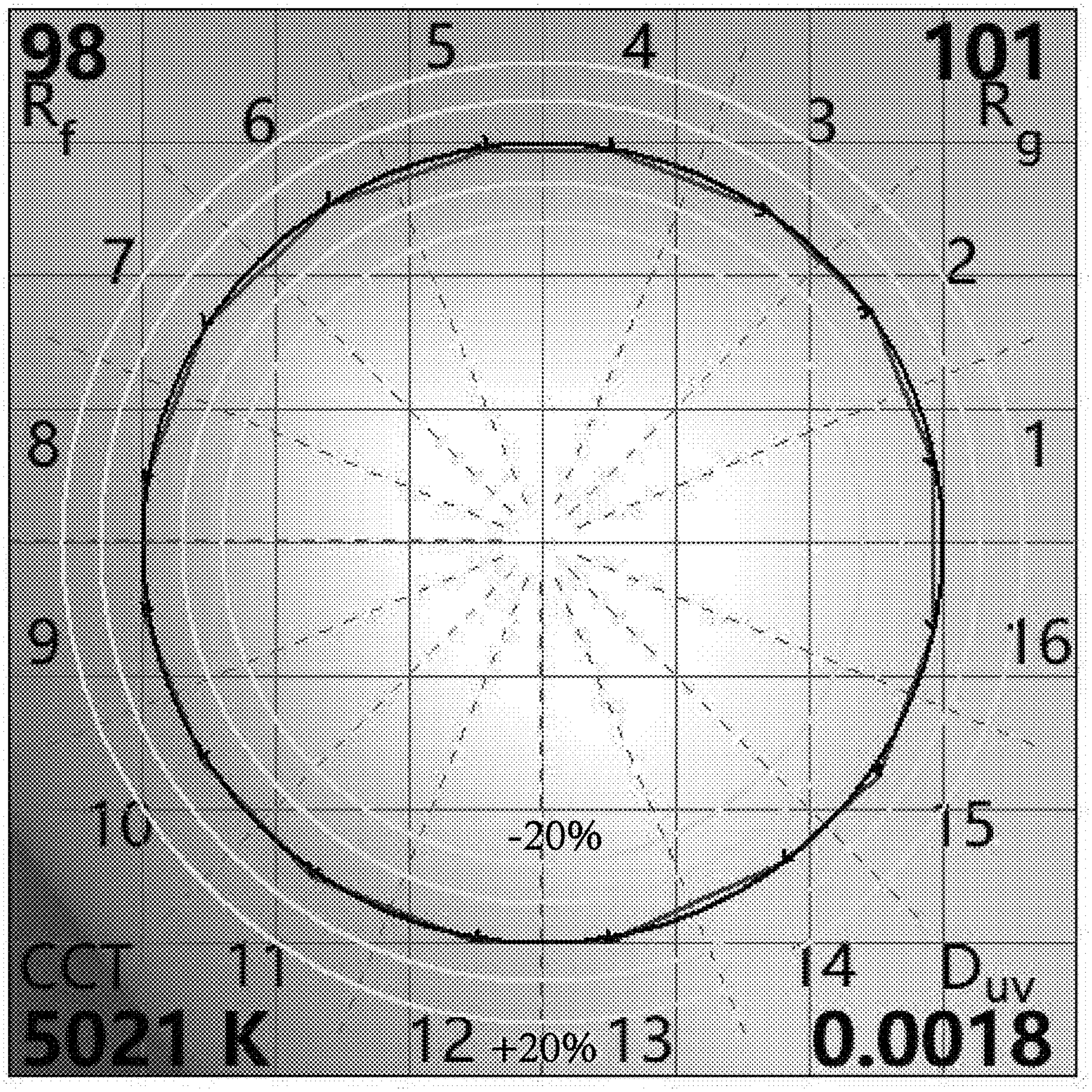
FIG. 9 is a schematic view of the TM-30 color vector graphic of the light produced by the spectrum-based light emission method in the above embodiment of the present invention.

Furthermore, to further illustrate the high degree of restoration of the spectrum of the light emitted by the spectrum-based light emission method of this embodiment of the present invention to the given solar spectrum, FIGS. 7 to 9 also show the color rendering index (CRI), TM-30 fidelity index, and TM-30 color vector graph of the light emitted by the spectrum-based light emission method of this embodiment of the present invention, respectively. As shown in FIG. 7, the color rendering index (CRI) of the light emitted by the spectrum-based light emission method for R1-R15 is greater than 95. As shown in FIG. 8, the TM-30 fidelity index demonstrates high replicability of the solar spectrum across 99 color samples. As shown in FIG. 9, the TM-30 color vector graphic shows a high Rf value of 98, which exhibits a high degree of color fidelity.

To further understand the present invention, when the given spectrum is the solar spectrum, the spectrum-based light emission method of another embodiment of the present invention is further disclosed.

Figure 10:
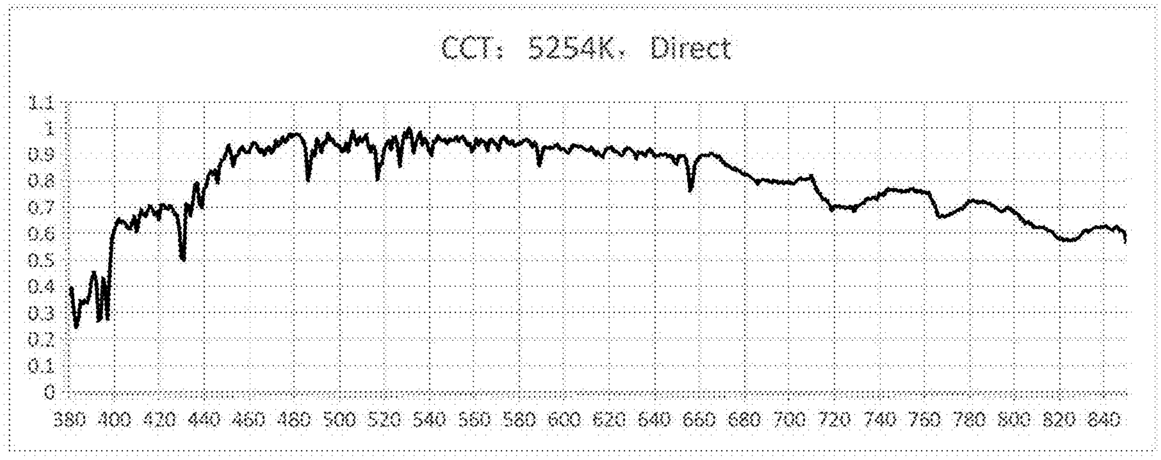
FIG. 10 is the given 5254K color temperature solar relative spectrum in the spectrum-based light emission method of another embodiment of the present invention.
Figure 11:
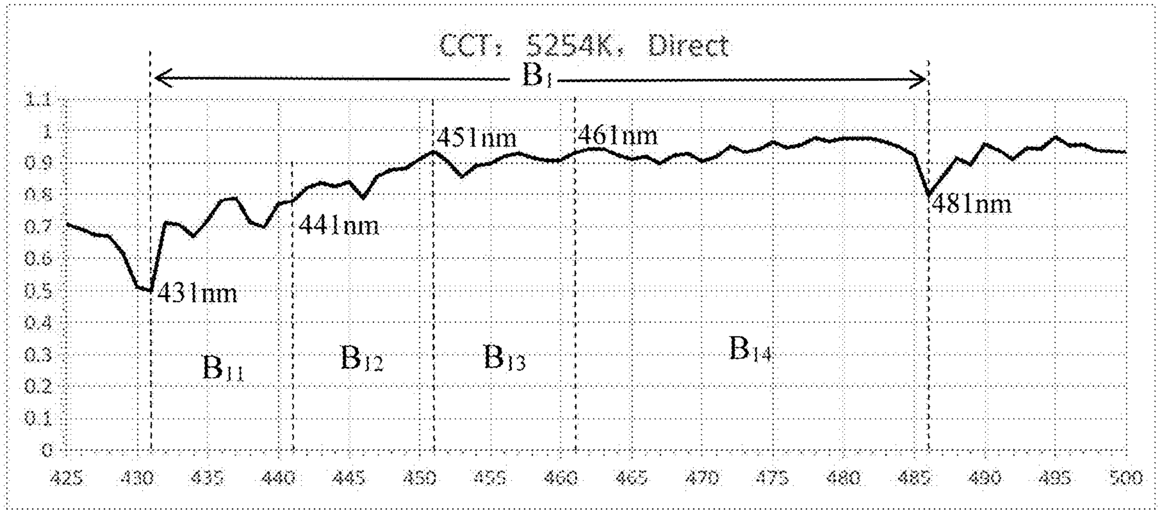
FIG. 11 is the enlarged view of the spectrum of the 5254K color temperature solar relative spectrum in the 425 nm to 500 nm wavelength range.
Figure 12:
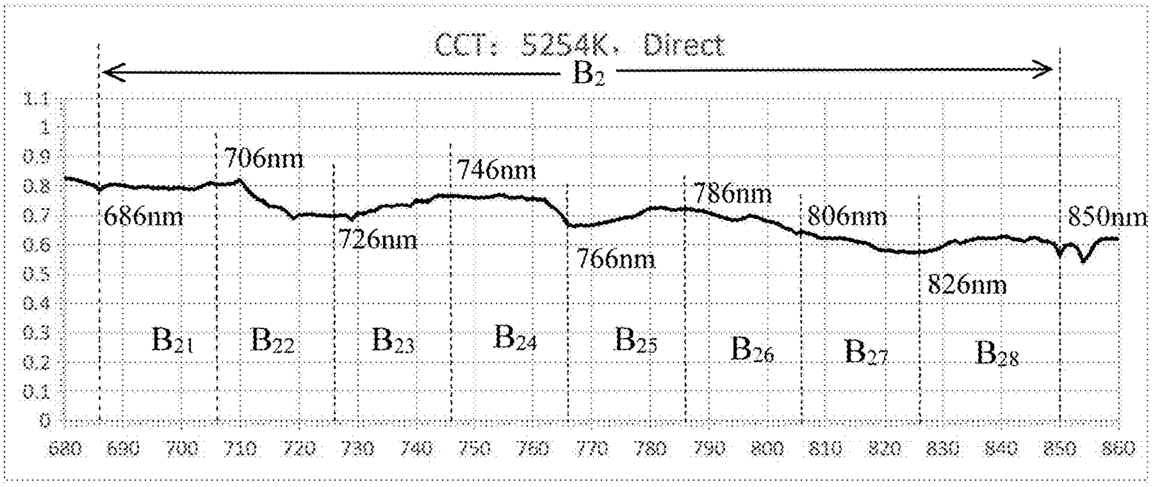
FIG. 12 is the enlarged view of the spectrum of the 5254K color temperature solar relative spectrum in the 680 nm to 860 nm wavelength range.

Specifically, in this embodiment of the present invention, the solar relative spectrum shown in FIG. 10 is specifically used as the final given spectrum in step (A), where the solar relative spectrum shown in FIG. 10 is the 380 nm-850 nm wavelength band portion of the 5254K color temperature solar relative spectrum. According to step (B), in the solar relative spectrum shown in FIG. 10, corresponding to FIG. 11, a primary waveband $B_1$ is divided with the absorption peak wavelengths of 431 nm and 486 nm as boundaries, and corresponding to FIG. 12, a primary waveband $B_2$ is divided with the absorption peak wavelengths of 686 nm and 850 nm as boundaries; wherein according to step (C), corresponding to FIG. 11, the primary waveband $B_1$ is subdivided into four secondary wavebands $B_{11}$, $B_{12}$, $B_{13}$, and $B_{14}$, and corresponding to FIG. 12, the primary waveband $B_2$ is subdivided into eight secondary wavebands $B_{21}$, $B_{22}$, $B_{23}$, $B_{24}$, $B_{25}$, $B_{26}$, $B_{27}$, and $B_{28}$. Specifically, in this embodiment of the present invention, the bandwidth of the secondary wavebands $B_{11}$, $B_{12}$ and $B_{13}$ is 10 nm, and the bandwidth of the secondary waveband $B_{14}$ is 25 nm, the bandwidth of the secondary wavebands $B_{21}$, $B_{22}$, $B_{23}$, $B_{24}$, $B_{25}$, $B_{26}$ and $B_{27}$ is 20 nm, and the bandwidth of the secondary waveband $B_{28}$ is 24 nm. The corresponding wavelength ranges of the secondary wavebands $B_{11}$, $B_{12}$, $B_{13}$, $B_{14}$, $B_{21}$, $B_{22}$, $B_{23}$, $B_{24}$, $B_{25}$, $B_{26}$, $B_{27}$, and $B_{28}$ are 431 nm-441 nm, 441 nm-451 nm, 451 nm-461 nm, 461 nm-486 nm, 686 nm-706 nm, 706 nm-726 nm, 726 nm-746 nm, 746 nm-766 nm, 766 nm-786 nm, 786 nm-806 nm, 806 nm-826 nm, and 826 nm-850 nm, respectively. Therefore, the mid-wavelengths of the secondary wavebands $B_{11}$, $B_{12}$, $B_{13}$, $B_{14}$, $B_{21}$, $B_{22}$, $B_{23}$, $B_{24}$, $B_{25}$, $B_{26}$, $B_{27}$, and $B_{28}$ are 431+10/2=436 nm, 441+10/2=446 nm, 451+10/2=456 nm, 461+25/2=473.5 nm, 686+20/2=696 nm, 706+20/2=716 nm, 726+20/2=736 nm, 746+20/2=756 nm, 766+20/2=776 nm, 786+20/2=796 nm, 806+20/2=816 nm, and 826+24/2=838 nm, respectively. A light source with an emission peak wavelength that is close to and matches the mid-wavelength of each of the secondary wavebands $B_{11}$, $B_{12}$, $B_{13}$, $B_{14}$, $B_{21}$, $B_{22}$, $B_{23}$, $B_{24}$, $B_{25}$, $B_{26}$, $B_{27}$, and $B_{28}$ is selected as the light source of the spectrum-based light-emitting fixture. Specifically, in this embodiment of the present invention, LED chips with emission peak wavelengths of 437 nm, 446 nm, 459 nm, 470 nm, 700 nm, 715 nm, 735 nm, 750 nm, 775 nm, and 837 nm are selected as the light sources of the spectrum-based light-emitting fixture, and fluorescent powders with emission peak wavelengths at 733 nm, 795 nm, and 821 nm are selected to perform wavelength conversion matching on the LED chips, so that the light source of the spectrum-based light-emitting fixture has an emission peak wavelength that matches the mid-wavelength of each of the secondary wavebands; wherein according to step (D), the spectral energy $E_{11}$, $E_{12}$, $E_{13}$, $E_{14}$, $E_{21}$, $E_{22}$, $E_{23}$, $E_{24}$, $E_{25}$, $E_{26}$, $E_{27}$, and $E_{28}$ of the secondary wavebands $B_{11}$, $B_{12}$, $B_{13}$, $B_{14}$, $B_{21}$, $B_{22}$, $B_{23}$, $B_{24}$, $B_{25}$, $B_{26}$, $B_{27}$, and $B_{28}$ are integrated. Specifically, in this embodiment of the present invention, according to a simplified formula $$E_{mn} = \Sigma_{\lambda_{mnS}}^{\lambda_{mnE-1}} \phi\lambda,$$

where Ø is the relative radiant energy value (i.e., the ordinate value in the solar relative spectrum shown in FIGS. 11 and 12), $E_{11}$=6.48, $E_{12}$=7.85, $E_{13}$=8.56, $E_{14}$=9.19, $E_{21}$=14.72, $E_{22}$=13.09, $E_{23}$=13.37, $E_{24}$=13.82, $E_{25}$=12.66, $E_{26}$=12.55, $E_{27}$=10.99, and $E_{28}$=11.04 are obtained correspondingly; wherein according to step (E), the radiant flux of the corresponding light source is matched with the spectral energy $E_{mn}$ of the corresponding secondary waveband $B_{mn}$.

It can be understood that the mass ratio of the fluorescent powder with the corresponding emission peak wavelength to the packaging silicone can be determined according to the matching relationship between the radiant flux of the light source with the same emission peak wavelength and the corresponding spectral energy $E_{mn}$ in step (E). In other words, to optimize the cost of the light source, in the state where a single light source has multiple emission peak wavelengths based on combinations of different wavelength conversion materials, the single light source is equivalently regarded as multiple light sources with different emission peak wavelengths, wherein the radiant flux of each light source corresponds to the mass ratio of the wavelength conversion material with the same emission peak wavelength to the packaging silicone. Thus, the mass ratio of the wavelength conversion material with different emission peak wavelengths to the packaging silicone can be determined based on the matching relationship between the radiant flux of the corresponding light source and the spectral energy $E_{mn}$ of the corresponding secondary waveband $B_{mn}$ in step (E).

It is worth noting that the specific numerical values of the emission peak wavelengths of the selected LED chips and the fluorescent powders in this embodiment of the present invention are merely examples. The corresponding light source having an emission peak wavelength that is close to the mid-wavelength of each of the secondary wavebands $B_{mn}$ should be understood as a light source having an emission peak wavelength within the wavelength range of the corresponding secondary waveband $B_{mn}$, wherein the emission peak wavelength is preferably within a 5 nm difference from the mid-wavelength of the corresponding secondary waveband $B_{mn}$. Therefore, in the spectrum-based light emission method of the present invention, when selecting the emission peak wavelengths of the corresponding LED chips and fluorescent powders that correspond to the mid-wavelength of each secondary waveband $B_{mn}$, the selection can be made within the wavelength range of the corresponding secondary waveband $B_{mn}$, and preferably within a 5 nm difference from the mid-wavelength of the corresponding secondary waveband $B_{mn}$. The present invention does not limit this.

Specifically, in this embodiment of the present invention, the wavelength conversion and matching of the light source is performed using the packaging silicone and fluorescent powders ratios shown in the following table:

| Packaging Silicone | FP 495 nm | FP 525 nm | FP 535 nm | FP 554 nm | FP 605 nm | FP 655 nm | FF 733 nm | FP 795 nm | FP 821 nm |
|---|---|---|---|---|---|---|---|---|---|
| 4 | 0.02 | 0.05 | 0.25 | 0.02 | 0.30 | 0.29 | 0.30 | 0.15 | 0.15 |

-continued

| Packaging Silicone | FP 495 nm | FP 525 nm | FP 535 nm | FP 554 nm | FP 605 nm | FP 655 nm | FF 733 nm | FP 795 nm | FP 821 nm |
|---|---|---|---|---|---|---|---|---|---|

FP = Fluorescent Powder

The emission peak wavelength of the fluorescent powder in the table above is allowed to have a tolerance range of 5 nm, and the corresponding fluorescent powder ratio is allowed to have a tolerance range of 15% based on the exemplary values shown in the table above. In other words, in this embodiment of the present invention, corresponding to the table above, wavelength conversion matching for the LED chips is further performed using the fluorescent powders, with emission peak wavelengths in the ranges of 495±5 nm, 525±5 nm, 535±5 nm, 554±5 nm, 605±5 nm, and 655±5 nm, respectively, to obtain emission peak wavelengths that match the wavebands other than the primary waveband $B_1$ and $B_2$.

Figure 13:
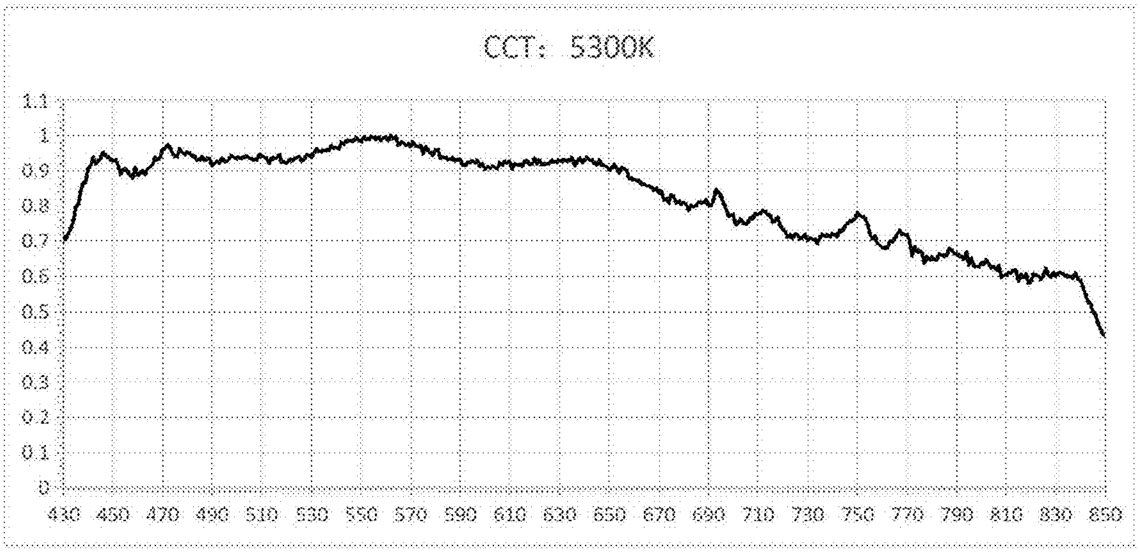
FIG. 13 is the emission spectrum of the spectrum-based light emission method in the above embodiment of the present invention.
Figure 14:
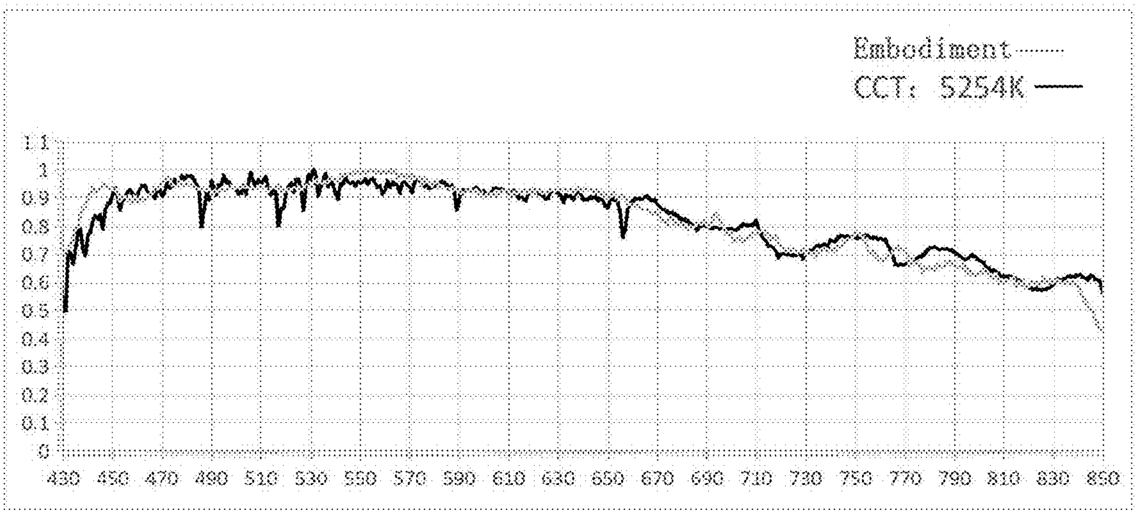
FIG. 14 is a comparative schematic view of the emission spectrum of the spectrum-based light emission method in the above embodiment of the present invention and the 5254K color temperature solar relative spectrum in the 430 nm to 850 nm wavelength range.

The spectrum of the light emitted by the spectrum-based light emission method of this embodiment of the present invention, as shown in FIG. 13, is compared with the 5254K color temperature solar relative spectrum in the 430 nm-850 nm wavelength band portion as shown in FIG. 10, and the comparison is presented in FIG. 14. It can be seen that the spectrum of the light emitted by the spectrum-based light emission method of this embodiment of the present invention exhibits a high degree of restoration to the given spectrum.

Figure 15:
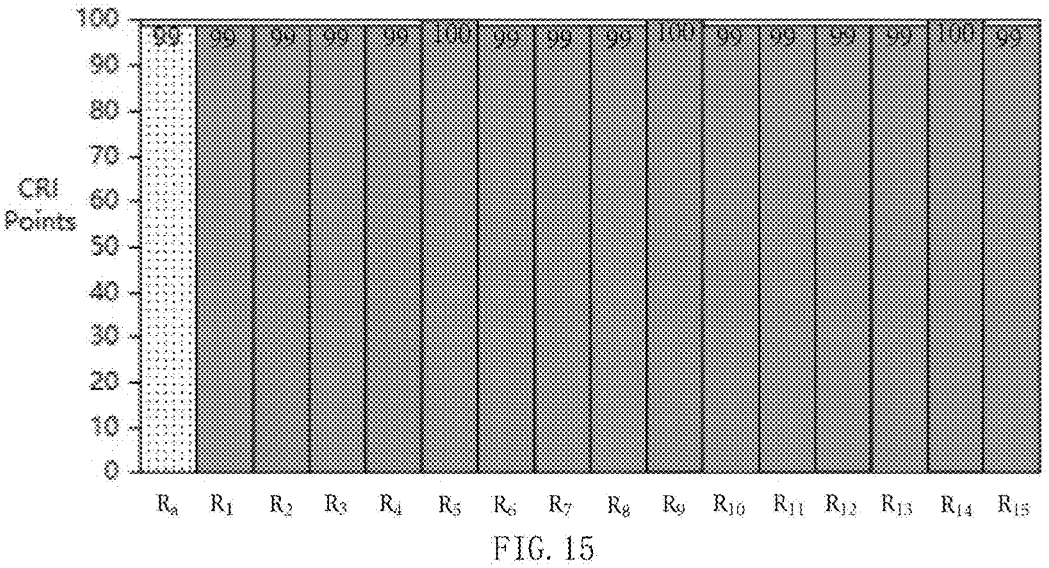
FIG. 15 is a schematic view of the color rendering index (CRI) of the light produced by the spectrum-based light emission method in the above embodiment of the present invention.
Figure 16:
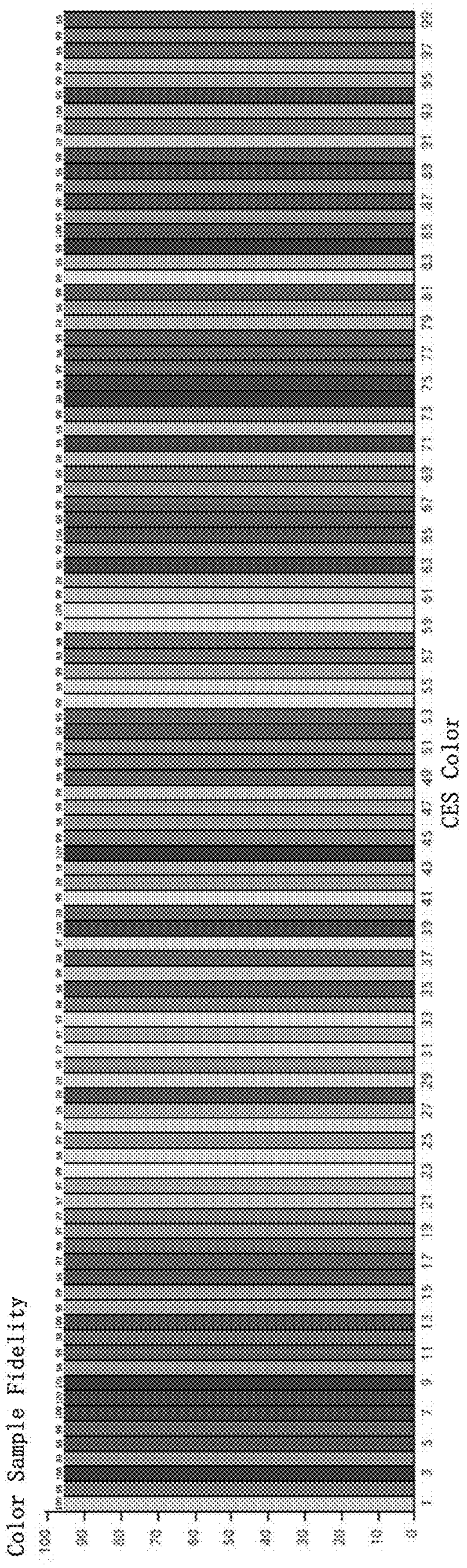
FIG. 16 is a schematic view of the TM-30 fidelity index of the light produced by the spectrum-based light emission method in the above embodiment of the present invention.
Figure 17:
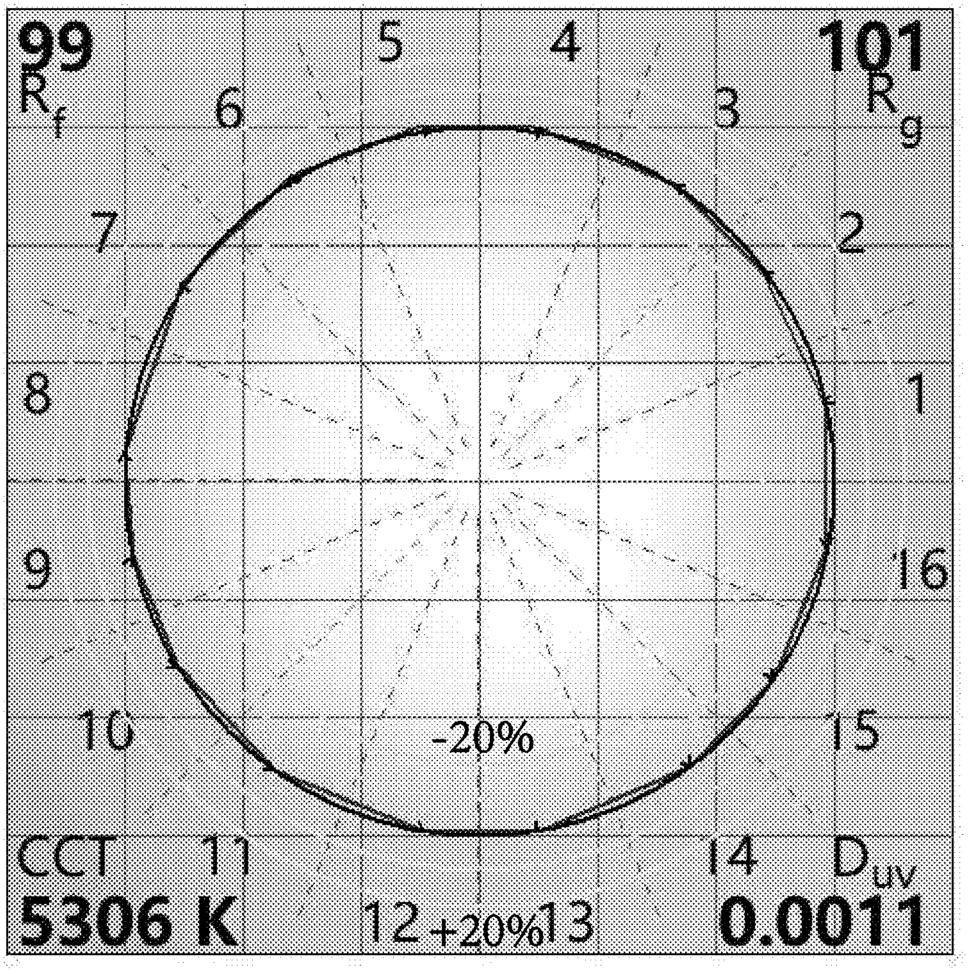
FIG. 17 is a schematic view of the TM-30 color vector graphic of the light produced by the spectrum-based light emission method in the above embodiment of the present invention.

Furthermore, to further illustrate the high degree of restoration of the spectrum of the light emitted by the spectrum-based light emission method of this embodiment of the present invention to the given solar spectrum, FIGS. 15 to 17 also show the color rendering index (CRI), TM-30 fidelity index, and TM-30 color vector graph of the light emitted by the spectrum-based light emission method of this embodiment of the present invention, respectively, wherein as shown in FIG. 15, the color rendering index (CRI) of the light emitted by the spectrum-based light emission method for R1-R15 is not less than 99. As shown in FIG. 16, the TM-30 fidelity index is not less than 96 across 99 color samples, and demonstrates high replicability of the solar spectrum. As shown in FIG. 17, the TM-30 color vector graphic shows a high Rf value of 99, which exhibits a high degree of color fidelity.

It is to be understood that the corresponding embodiments described above in the present invention are merely examples and do not limit the present invention. In some embodiments of the present invention, based on the embodiments described above, the spectrum-based light emission method of the present invention can be further applied to perform energy matching for the short-wavelength portion of the solar spectrum (e.g., the 360 nm-430 nm wavelength portion), thereby enabling the spectrum-based light-emitting fixture to have a photobiological effect in the short-wavelength region, which is beneficial to human health.

Those skilled in the art should understand that the embodiments of the present invention described above and illustrated in the drawings are merely examples and do not limit the present invention. The objectives of the present invention have been fully and effectively achieved. The functional and structural principles of the present invention have been demonstrated and described in the embodiments. Any modification of the present invention that does not deviate from these principles shall fall within the scope of the present invention.

What is claimed is:

1. A spectrum-based light emission method, comprising the following steps:

(A) providing a given spectrum to a spectrum-based light-emitting fixture, wherein said given spectrum has absorption peaks that are presented as peaks and troughs in a variation of radiant energy values along a wavelength;

(B) dividing said given spectrum into primary wavebands $B_m$ based on identification of said absorption peaks in said given spectrum that meets certain energy variation requirements and using the wavelengths of said absorption peaks as boundaries;

(C) subdividing each primary waveband $B_m$ into multiple secondary wavebands $B_{mn}$, where the light sources of said spectrum-based light-emitting fixture have emission peak wavelengths that are close to and match the mid-wavelengths of said corresponding secondary wavebands $B_{mn}$, wherein the starting wavelength of each secondary waveband $B_{mn}$ is denoted as $\lambda_{mnS}$, the ending wavelength is denoted as $\lambda_{mnE}$, and the mid-wavelength of each secondary waveband $B_{mn}$ is calculated as $(\lambda_{mnS}+\lambda_{mnE})/2$;

(D) integrating the spectral energy $E_{mn}$ of each secondary waveband $B_{mn}$; and (E) matching the radiant flux of said corresponding light source with said spectral energy $E_{mn}$ of said corresponding secondary waveband $B_m$.

2. The spectrum-based light emission method, as recited in claim 1, wherein step (A) further comprises normalizing said given spectrum, and using said normalized relative spectrum as a final given spectrum.

3. The spectrum-based light emission method, as recited in claim 1, wherein in step (B), said identified absorption peaks are absorption peaks that appear in the form of troughs.

4. The spectrum-based light emission method, as recited in claim 1, wherein in step (C), the bandwidth of each secondary waveband $B_{mn}$ that corresponds to $(\lambda_{mnE}-\lambda_{mnS})$ meets the condition 2 nm$\leq(\lambda_{mnE}-\lambda_{mnS})\leq$50 nm.

5. The spectrum-based light emission method, as recited in claim 4, wherein in step (C), the light source of said spectrum-based light-emitting fixture has an emission peak wavelength that is close to and matches the mid-wavelength of each of said secondary waveband $B_{mn}$, within a 10 nm difference.

6. The spectrum-based light emission method, as recited in claim 5, wherein in step (D), said spectral energy $E_{mn}$ of each secondary waveband $B_{mn}$ is obtained by a simplified formula $$E_{mn} = \Sigma_{\lambda_{mnS}}^{\lambda_{mnE}-1} \emptyset\lambda,$$

where Ø is the relative radiant energy value of said given spectrum.

7. The spectrum-based light emission method, as recited in claim 6, wherein in step (C), when said spectrum-based light-emitting fixture has already been manufactured, light sources corresponding to said spectrum-based light-emitting fixture have been selected with multiple emission peak wavelengths, said secondary waveband $B_m$ is subdivided based on the emission peak wavelength of said corresponding light source as the mid-wavelength, such that said light source of said spectrum-based light-emitting fixture has an emission peak wavelength that is close to and matches the mid-wavelength of each said-secondary waveband $B_{mn}$.

8. The spectrum-based light emission method, as recited in claim 6, wherein in step (C), when said spectrum-based light-emitting fixture has already been manufactured, and light sources corresponding to said spectrum-based light-emitting fixture have been selected with multiple emission peak wavelengths, after subdividing said secondary waveband $B_{mn}$, light sources with emission peak wavelengths that are close to the mid-wavelengths of said corresponding secondary wavebands $B_{mn}$ are selected as the actual light-emitting light sources of said spectrum-based light-emitting fixture, such that said actual light-emitting light sources of said spectrum-based light-emitting fixture have emission peak wavelengths that are close to and match the mid-wavelengths of said corresponding secondary wavebands $B_{mn}$.

9. The spectrum-based light emission method, as recited in claim 6, wherein in step (C), after subdividing each said-primary waveband $B_m$ into multiple secondary wavebands $B_{mn}$, the method further includes:

selecting light sources with emission peak wavelengths that are close to and match the mid-wavelengths of said corresponding secondary wavebands $B_{mn}$ as the light sources of said spectrum-based light-emitting fixture.

10. The spectrum-based light emission method, as recited in claim 9, wherein in the state where a single light source has multiple emission peak wavelengths based on a combination of different LED chips, said single light source is equivalently regarded as multiple light sources with different emission peak wavelengths in said spectrum-based light-emitting fixture, wherein the radiant power of each LED chip in said single light source is independently and adjustably set, corresponding to step (E), and setting the radiant flux of said light source with each emission peak wavelength is equivalent to setting the radiant power of said LED chip with the same emission peak wavelength in said single light source.

11. The spectrum-based light emission method, as recited in claim 9, wherein in the state where a single light source has multiple emission peak wavelengths based on the combination of different wavelength conversion materials in its packaging silicone, said single light source is equivalently regarded as multiple light sources with different emission peak wavelengths in said spectrum-based light-emitting fixture, corresponding to said step (E), and the radiant flux of each light source with a specific emission peak wavelength is equivalent to the mass ratio of said wavelength conversion material with the same emission peak wavelength to said packaging silicone.

12. The spectrum-based light emission method, as recited in claim 11, wherein in step (B), one primary waveband $B_1$ in said primary wavebands $B_m$ is defined using said absorption peaks at wavelengths of 431 nm and 486 nm as boundaries.

13. The spectrum-based light emission method, as recited in claim 12, wherein in step (C), said primary waveband $B_1$ is subdivided into four secondary wavebands $B_{11}$, $B_{12}$, $B_{13}$, and $B_{14}$, wherein the bandwidth of said secondary wavebands $B_{11}$, $B_{12}$ and $B_{13}$ is 10 nm, and the bandwidth of said secondary waveband $B_{14}$ is 25 nm, the corresponding wavelength ranges of said secondary wavebands $B_{11}$, $B_{12}$, $B_{13}$, and $B_{14}$ are 431 nm-441 nm, 441 nm-451 nm, 451 nm-461 nm, and 461 nm-486 nm, respectively, and the mid-wavelength of said secondary waveband $B_{11}$ is 436 nm, the mid-wavelength of said secondary waveband $B_{12}$ is 446 nm, the mid-wavelength of said secondary waveband $B_{13}$ is 456 nm, and the mid-wavelength of said secondary waveband $B_{14}$ is 473.5 nm.

14. The spectrum-based light emission method, as recited in claim 13, wherein LED chips with emission peak wavelengths in the ranges of 436±5 nm, 446±5 nm, 456±5 nm, and 473.5±5 nm are selected as the light sources for said spectrum-based light-emitting fixture to obtain emission peak wavelengths that match the mid-wavelengths of said corresponding secondary wavebands, and wavelength conversion matching for said LED chips is performed simultaneously, using fluorescent powders with emission peak wavelengths in the ranges of 495±5 nm, 535±5 nm, and 655±5 nm, respectively, to obtain emission peak wavelengths that match the wavebands other than said primary waveband $B_1$.

15. The spectrum-based light emission method, as recited in claim 13, wherein in step (B), one primary waveband $B_2$ in said primary wavebands $B_m$ is defined using said absorption peaks at wavelengths of 686 nm and 850 nm as boundaries.

16. The spectrum-based light emission method, as recited in claim 15, wherein in step (C), said primary waveband $B_2$ is subdivided into eight secondary wavebands $B_{21}$, $B_{22}$, $B_{23}$, $B_{24}$, $B_{25}$, $B_{26}$, $B_{27}$, and $B_{28}$, wherein the bandwidth of said secondary wavebands $B_{21}$, $B_{22}$, $B_{23}$, $B_{24}$, $B_{25}$, $B_{26}$ and $B_{27}$ is 20 nm, and the bandwidth of said secondary waveband $B_{28}$ is 24 nm, the corresponding wavelength ranges of said secondary wavebands $B_{21}$, $B_{22}$, $B_{23}$, $B_{24}$, $B_{25}$, $B_{26}$, $B_{27}$, and $B_{28}$ are 686 nm to 706 nm, 706 nm to 726 nm, 726 nm to 746 nm, 746 to 766 nm, 766 nm to 786 nm, 786 nm to 806 nm, 806 nm to 826 nm, and 826 nm to 850 nm, respectively, and the mid-wavelengths of said secondary wavebands $B_{21}$, $B_{22}$, $B_{23}$, $B_{24}$, $B_{25}$, $B_{26}$, $B_{27}$, and $B_{28}$ are 696 nm, 716 nm, 736 nm, 756 nm, 776 nm, 796 nm, 816 nm, and 838 nm, respectively.

17. The spectrum-based light emission method, as recited in claim 16, wherein LED chips with emission peak wavelengths within the wavelength ranges of said secondary wavebands $B_{11}$, $B_{12}$, $B_{13}$, $B_{14}$, $B_{21}$, $B_{22}$, $B_{23}$, $B_{24}$, $B_{25}$, $B_{26}$, $B_{27}$, and $B_{28}$ are selected as the light sources for said spectrum-based light-emitting fixture, and fluorescent powders with emission peak wavelengths in the ranges of 736±5 nm, 796±5 nm, and 816±5 nm are selected to perform wavelength conversion matching with said LED chips to obtain emission peak wavelengths that match the mid-wavelengths of said corresponding secondary wavebands.

18. The spectrum-based light emission method, as recited in claim 17, wherein fluorescent powders with emission peak wavelengths in the ranges of 495±5 nm, 525±5 nm, 535±5 nm, 554±5 nm, 605±5 nm, and 655±5 nm are further selected to perform wavelength conversion matching with said LED chips to obtain emission peak wavelengths that match the wavebands other than said primary waveband $B_1$ and said primary waveband $B_2$.

19. A spectrum-based light-emitting fixture, comprising multiple light sources, in the state where each said-light source has at least one corresponding emission peak wavelength, said light sources of said spectrum-based light-emitting fixture exhibit multiple emission peak wavelengths, wherein said spectrum-based light-emitting fixture emits light according to the following steps:

(a) providing a given spectrum to said spectrum-based light-emitting fixture;

(b) dividing said given spectrum into primary wavebands $B_m$ based on identification of absorption peaks in said given spectrum that meet certain energy variation requirements and using wavelengths of said absorption peaks as boundaries;

(c) subdividing each said primary waveband $B_m$ into multiple secondary wavebands $B_{mn}$, where the light sources of said spectrum-based light-emitting fixture have emission peak wavelengths that are close to and match the mid-wavelengths of said corresponding secondary wavebands $B_{mn}$, wherein the starting wavelength of each said secondary waveband $B_{mn}$ is denoted as $\lambda_{mnS}$, the ending wavelength is denoted as $\lambda_{mnE}$, and the mid-wavelength of each said secondary waveband $B_{mn}$ is calculated as $(\lambda_{mnS}+\lambda_{mnE})/2$;

(d) integrating the spectral energy $E_{mn}$ of each secondary waveband $B_{mn}$; and (e) matching the radiant flux of said corresponding light source with said spectral energy $E_{mn}$ of corresponding secondary waveband $B_{mn}$.

20. The spectrum-based light-emitting fixture, as recited in claim 19, wherein in step (c), the bandwidth of each secondary waveband $B_{mn}$ that corresponds to $(\lambda_{mnE}-\lambda_{mnS})$ meets the condition 10 nm$\leq(\lambda_{mnE}-\lambda_{mnS})\leq$40 nm.

21. The spectrum-based light-emitting fixture, as recited in claim 20, wherein in step (c), said light source of said spectrum-based light-emitting fixture has an emission peak wavelength that is close to and matches the mid-wavelength of each secondary waveband $B_{mn}$, within a 5 nm difference range.

22. The spectrum-based light-emitting fixture, as recited in claim 21, wherein in step (d), said spectral energy $E_m$ of each secondary waveband $B_{mn}$ is obtained using a simplified formula $$E_{mn}=\Sigma_{\lambda_{mnS}}^{\lambda_{mnE}-1}\emptyset\lambda,$$

where Ø is the relative radiant energy value of said given spectrum.

* * * * *